United States Patent
Magee et al.

(10) Patent No.: US 10,619,929 B2
(45) Date of Patent: Apr. 14, 2020

(54) ADDITIVE MANUFACTURED FLOW COMPONENTS WITH STRESS-RESISTANT STRUCTURES

(71) Applicant: General Electric Company, Schenectady, NY (US)

(72) Inventors: Jeffrey Frederick Magee, Longmeadow, MA (US); Van Dang, Bloomfield, CT (US); Daniel Jason Erno, Clifton Park, NY (US); K M K Genghis Khan, Niskayuna, NY (US); Haiyang Qian, Windsor, CT (US)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 15/830,537

(22) Filed: Dec. 4, 2017

(65) Prior Publication Data

US 2019/0170444 A1 Jun. 6, 2019

(51) Int. Cl.
| | |
|---|---|
| *F28B 1/00* | (2006.01) |
| *B23K 26/342* | (2014.01) |
| *B33Y 10/00* | (2015.01) |
| *B33Y 80/00* | (2015.01) |
| *F28F 1/00* | (2006.01) |
| *F28F 9/16* | (2006.01) |
| *F28F 9/04* | (2006.01) |
| *F28D 21/00* | (2006.01) |
| *F28F 9/02* | (2006.01) |
| *F22B 37/22* | (2006.01) |

(52) U.S. Cl.
CPC .............. *F28B 1/00* (2013.01); *B23K 26/342* (2015.10); *B33Y 10/00* (2014.12); *B33Y 80/00* (2014.12); *F28F 1/00* (2013.01); *F28F 9/04* (2013.01); *F28F 9/16* (2013.01); *F22B 37/225* (2013.01); *F28D 2021/0064* (2013.01); *F28F 2009/0285* (2013.01); *F28F 2225/04* (2013.01); *F28F 2225/08* (2013.01); *F28F 2245/00* (2013.01); *F28F 2255/18* (2013.01)

(58) Field of Classification Search
CPC ........... F28B 1/00; B33Y 10/00; B33Y 80/00; B23K 26/342; F28F 9/04; F28F 9/16; F28F 1/00; F28D 2021/0064; F22B 37/225
USPC ............................................ 165/180, 104.26
See application file for complete search history.

(56) References Cited

U.S. PATENT DOCUMENTS

| | | | | |
|---|---|---|---|---|
| 5,954,128 | A | * | 9/1999 | Harkins .................... F28D 7/12 165/142 |
| 8,573,252 | B2 | | 11/2013 | Perrin |
| 8,828,311 | B2 | | 9/2014 | Medina et al. |
| 2010/0291401 | A1 | | 11/2010 | Medina et al. |

(Continued)

*Primary Examiner* — Joel M Attey
(74) *Attorney, Agent, or Firm* — Wofflman Warnick LLC

(57) ABSTRACT

This disclosure provides flow components, methods of additive manufacture, and output manifolds for heat recovery steam generators incorporating flow components. A flow component may include an annular wall that defines a flow path for a fluid. The annular wall may have a normative region and a stress region. The annular wall in the stress region may include a continuous skin to form a portion of the interior wall surface and an additive manufactured mesh adjacent to the continuous skin to the interior of the annular wall. The annular wall in the normative region may have a cross-section with a different structure than the stress region.

17 Claims, 5 Drawing Sheets

(56) References Cited

U.S. PATENT DOCUMENTS

2015/0007960 A1\* 1/2015 Kawano .................. E21B 43/10
165/45

\* cited by examiner

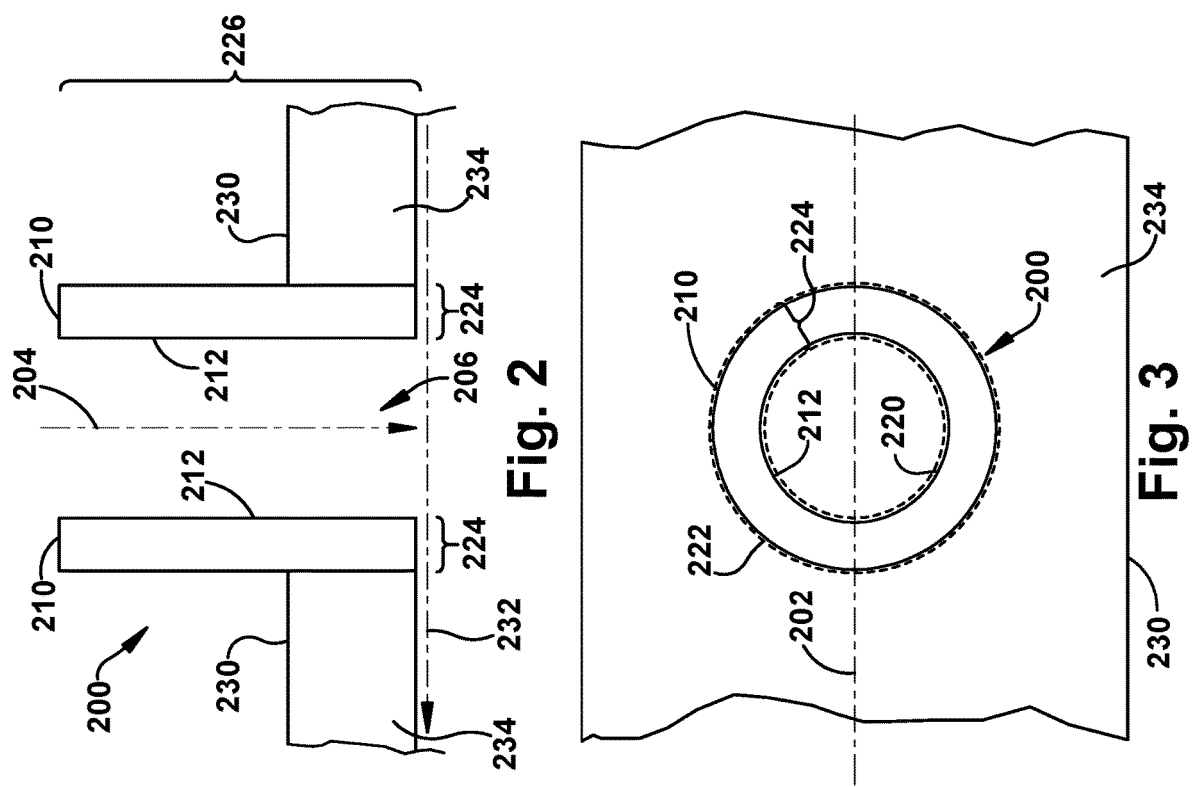
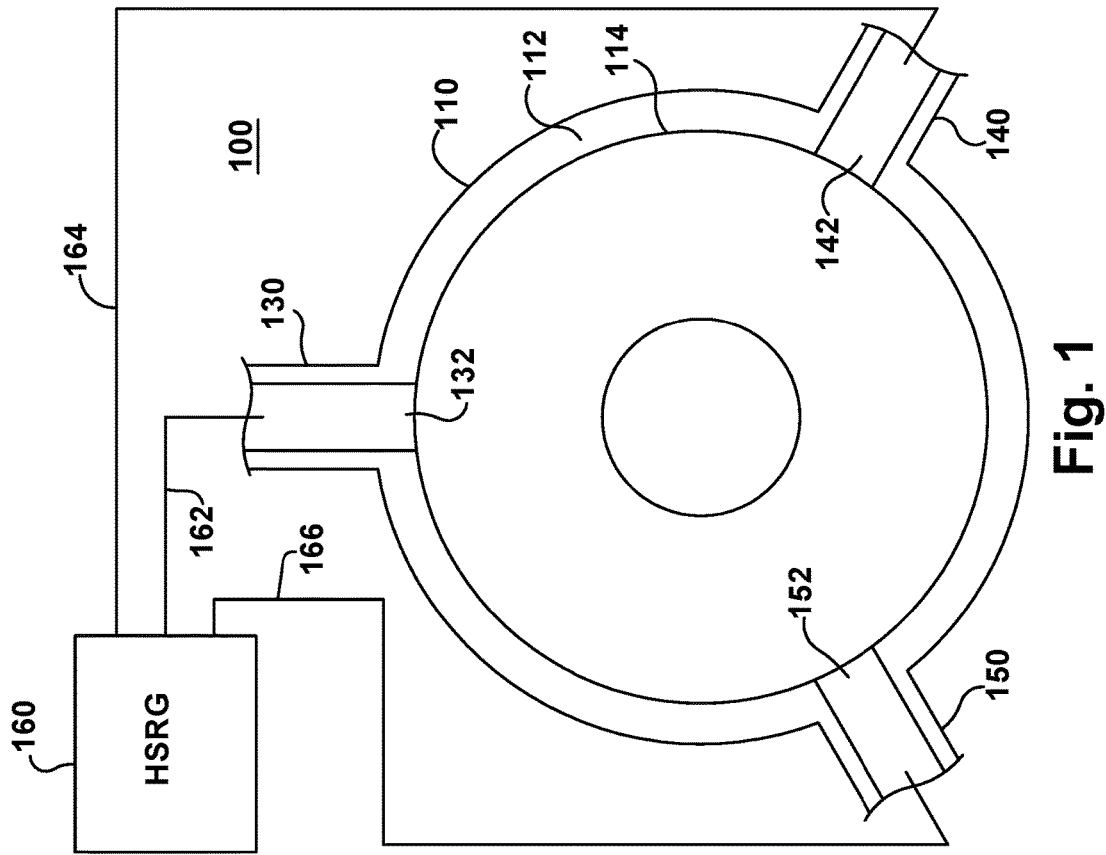

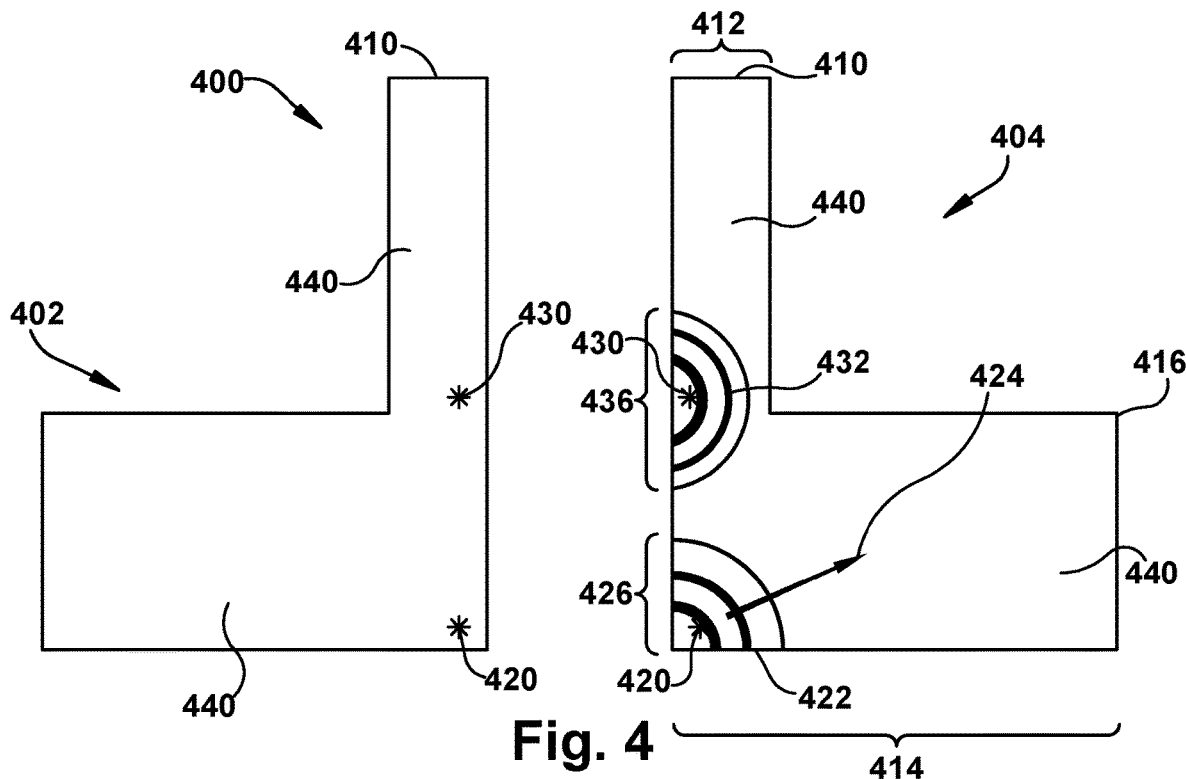
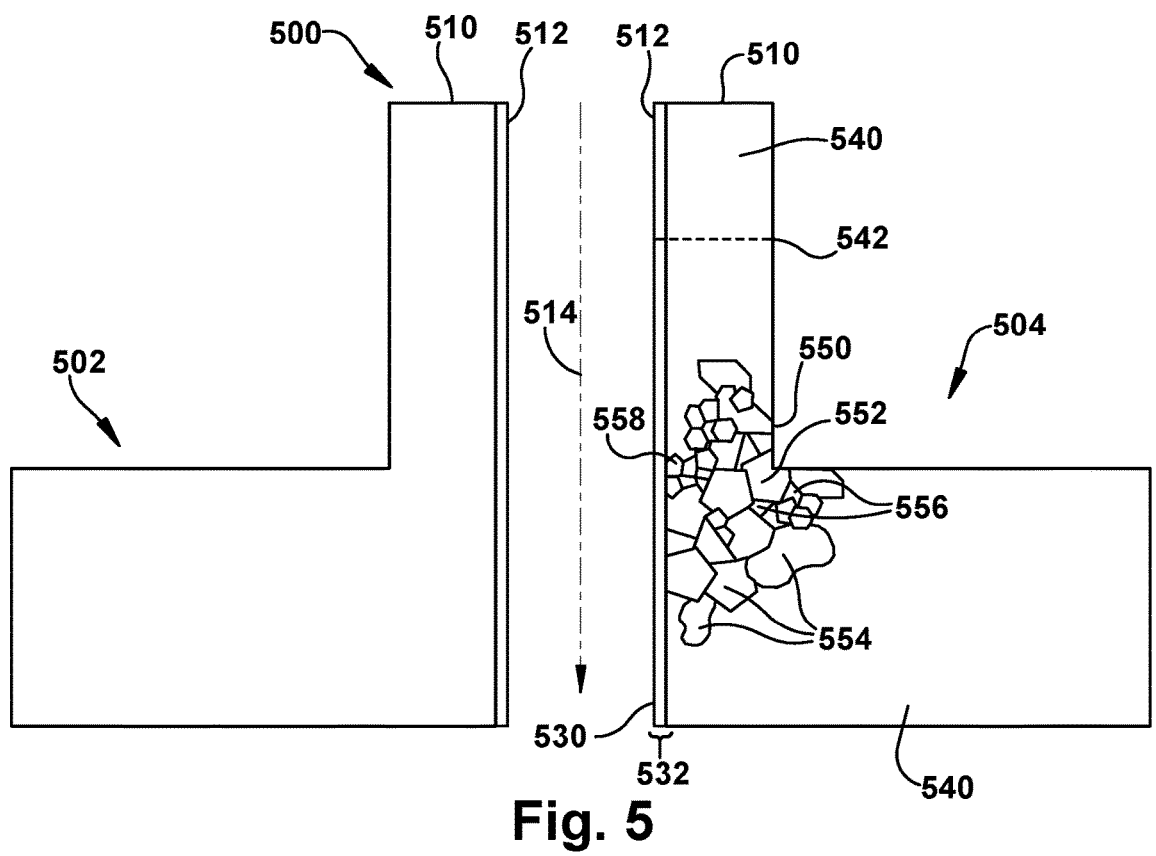

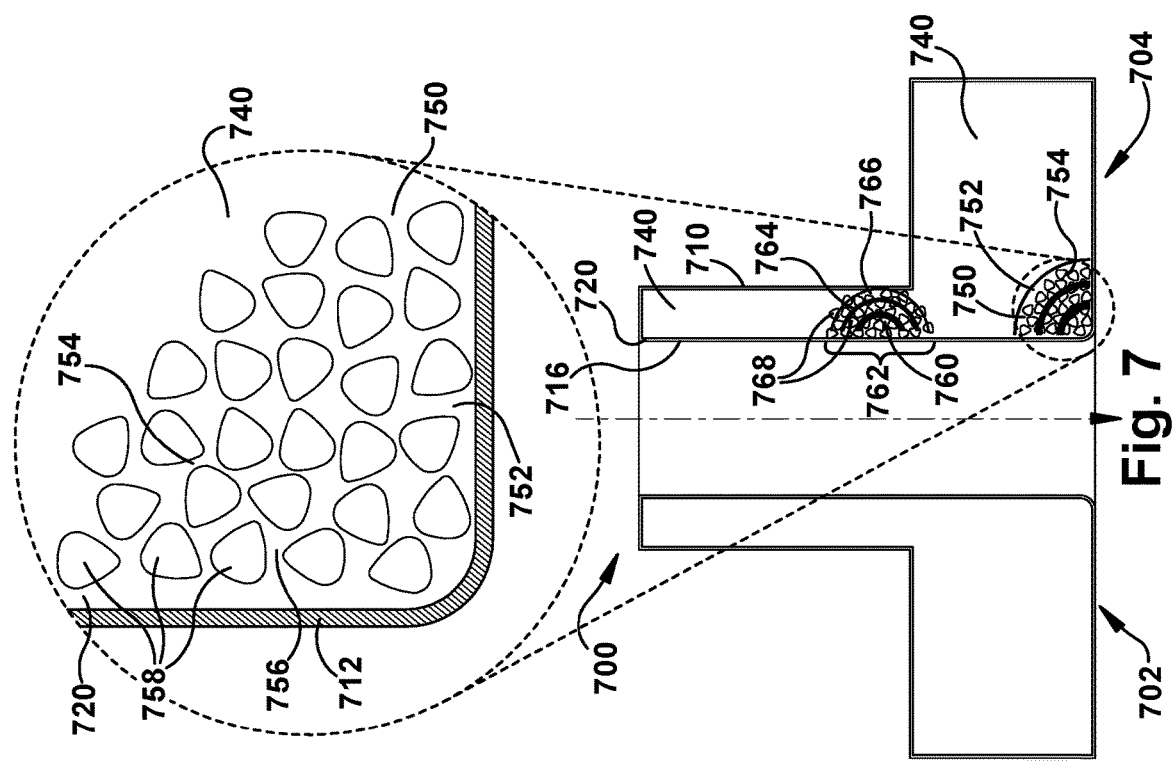
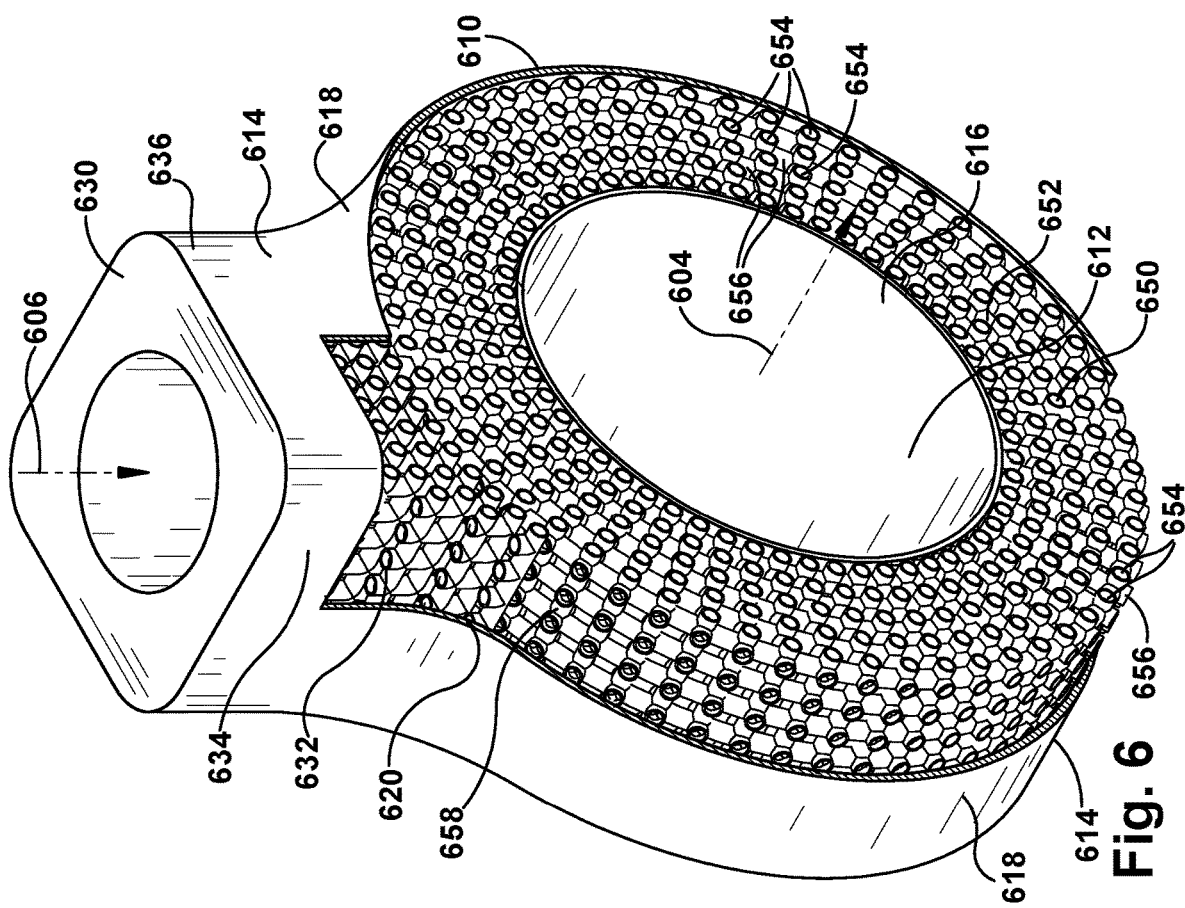

ADDITIVE MANUFACTURED FLOW COMPONENTS WITH STRESS-RESISTANT STRUCTURES

BACKGROUND OF THE INVENTION

The disclosure relates to components and systems for directing fluid flow in stressful environments, as well as methods of manufacturing such components, and, more specifically, stress-resistant flow components, such as those used in heat recovery steam generator output manifolds.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include piping, fittings, and other flow components for installation in a power plant or subsystem thereof, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing can allow a component to be formed from a reserve of fine metal powder positioned on a build plate, which is processed by an electron beam or laser (using fusing heat treatments such as sintering or melting) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process.

Additive manufacturing opens opportunities for complex internal and surface structures for metal components, as well as dynamic design processes and component customization.

Heat recovery steam generator systems may include an output manifold for aggregating flow and routing the working fluid to a steam turbine and/or other process demand. Any given output manifold may have defined flow capacities, wall thickness, materials, and link assemblies with corresponding angles for controlling and enduring thermal stresses. Any given output manifold may have defined flow capacities, wall thickness, materials, and link assemblies for controlling and enduring thermal stresses. However, thermal stress from high cycling systems may increase component wear and decrease the life of the output manifold and/or its components made using conventional molding or reductive manufacturing techniques.

SUMMARY OF THE INVENTION

A first aspect of this disclosure provides a flow component with additive manufactured stress-resistant structures. An annular wall has an interior wall surface defining a flow path for a fluid. The annular wall has a wall circumference, a wall length, and a wall thickness. The annular wall has at least one stress region. The stress region includes a continuous skin having a skin thickness and defining a portion of the interior wall surface. The stress region also includes an additive manufactured mesh adjacent the continuous skin in the direction of the wall thickness. The mesh is comprised of structural material and a plurality of voids. The annular wall has at least one normative region. The normative region includes a normative cross-section in the direction of the wall thickness that has a different structure than the mesh of the at least one stress region.

A second aspect of the disclosure provides a method for additive manufacturing of a flow component with stress-resistant structures. A stress profile of a proposed flow component is measured under at least one use condition. At least one normative region of the proposed flow component having a normative stress value is defined. At least one stress region in the proposed flow component with a stress value higher than the normative stress value is defined. A flow component is additively manufactured based on the proposed flow component. The flow component has an annular wall. The annular wall has a wall circumference, a wall length, a wall thickness, and an interior wall surface defining a flow path for a fluid. The annular wall in the stress region includes a continuous skin having a skin thickness and defining a portion of the interior wall surface and an additive manufactured mesh adjacent the continuous skin in the direction of the wall thickness. The mesh is comprised of structural material and a plurality of voids. The annular wall in the normative region includes a normative cross-section in the direction of the wall thickness that has a different structure than the mesh of the stress region.

A third aspect of the disclosure provides an output manifold for a heat recovery steam generator using an additive manufactured flow component with stress-resistant structures. An annular wall of the output manifold has an interior wall surface defining a flow path for a fluid. The annular wall has a wall circumference, a wall length, and a wall thickness. The annular wall has at least one stress region. The stress region includes a continuous skin having a skin thickness and defining a portion of the interior wall surface. The stress region also includes an additive manufactured mesh adjacent the continuous skin in the direction of the wall thickness. The mesh is comprised of structural material and a plurality of voids. The annular wall includes at least one normative region. The normative region includes a normative cross-section in the direction of the wall thickness that has a different structure than the mesh of the at least one stress region.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a cutaway view of a portion of an example output manifold according to various embodiments of the disclosure.

FIG. 2 shows a cross-section of an example flow component of an output manifold according to various embodiments of the disclosure.

FIG. 3 shows an alternate view of the example flow component of FIG. 2.

FIG. 4 shows an example stress measurement of a flow component according to various embodiments of the disclosure.

FIG. 5 shows a cross-section with an example stress-resistant structure for a flow component according to various embodiments of the disclosure.

FIG. 6 shows a cutaway view of an example flow component with an example stress-resistant structure according to various embodiments of the disclosure.

FIG. 7 shows a cross-section with an example stress-resistant structure for a flow component according to various embodiments of the disclosure.

Figure 8:
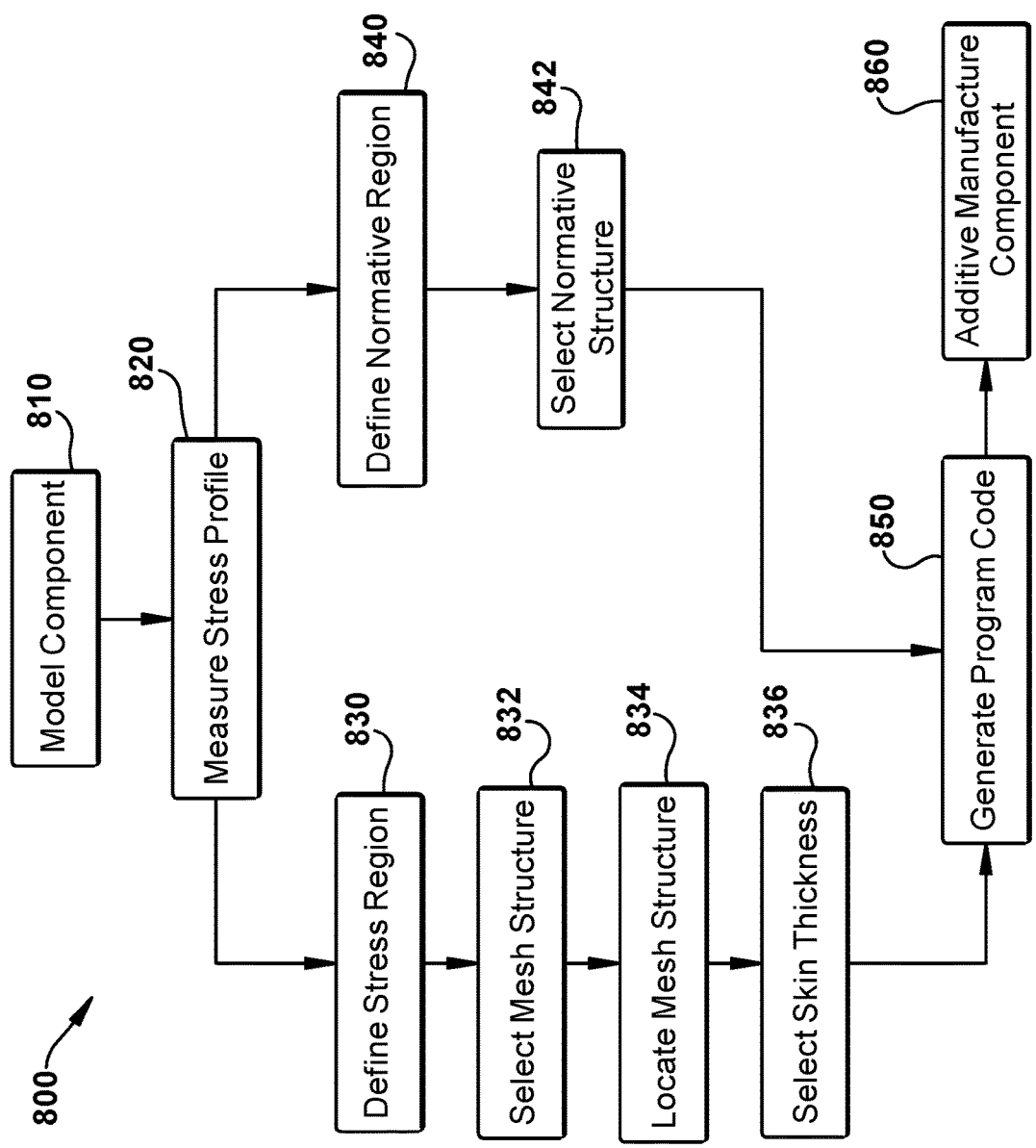
FIG. 8 shows a method of additive manufacturing according to various embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, a portion of an example output manifold 100 is shown. For example, output manifold 100 may include a configuration of one or more lines for collecting and distributing heated and pressurized fluids from a heat recovery steam generator (HRSG) 160 to a steam turbine or other process. In some configurations, output manifold 100 may include one or more collecting and/or output lines that are fed by header lines from HRSG 160. For example, output manifold 100 may include a line 110, which may include an annular wall 112 with an interior surface 114 defining a fluid flow path through line 110. Annular wall 112 may include any generally ring-like cross-section, including circular, oval, elliptical, etc. that defines a generally central flow path enclosed by a surrounding cross-section. In the view in FIG. 1, the flow path would be into or out of the page, depending on the location of the outlet (not shown) from output manifold 100. Output manifold 100 may include a plurality of header links 130, 140, 150 arranged around the circumference of annular wall 112. Each of header links 130, 140, 150 may connect to header lines 162, 164, 166 for receiving heated and pressurized fluids from HRSG 160. Header links 130, 140, 150 each define a fluid flow path to their respective collecting outlets 132, 142, 152 through annular wall 112 and into line 110. Collecting outlets 132, 142, 152 may be junction outlets between the flow paths of header links 130, 140, 150 and line 110, an adjacent flow component. Fluids collected from header lines 162, 164, 166 may flow through header links 130, 140, 150 to join the fluid flow path through line 110 to the outlet of output manifold 100.

In some embodiments, output manifold 100 may include a plurality of header link junctions, such as the portion of output manifold 100 shown in FIG. 1, arranged along the length of line 110. These header link junctions may represent areas where thermal stresses are uneven, particularly around header links 130, 140, 150 and collecting outlets 132, 142, 152. Each of header links 130, 140, 150 may be a flow component for directing fluid flow from their respective header lines 162, 164, 166 into line 110 through collecting outlets 132, 142, 152. Header links 130, 140, 150 may include stress-resistant internal structures (not shown) in the stress regions that are created by fluid flow in certain operating conditions, such as high cycle rates.

Referring to FIGS. 2 and 3, FIG. 3 shows an end view of a flow component 200, such as header links 130, 140, 150 in FIG. 1, and FIG. 2 shows a cross-section of flow component 200 along line 202 in FIG. 3 is shown. A flow component may include any mechanical structure for directing fluid flow through a passage and generally includes at least one interior wall surface in direct contact with the fluid. Flow components may be fluidically connected to other flow components to form a fluid path. Fluidically connected flow components, assemblies (such as output manifolds), and systems may enable fluids to flow among them in a single direction (generally referred to as downstream) or in multiple directions. Fluid paths among fluidically connected flow components may include control structures, such as valves, filters, pumps, reservoirs, etc. Lines may be flow components for directing fluids along a generally linear path for a desired distance and are generally embodied in rigid or flexible pipes with an annular cross-section.

Flow component 200 may include an annular wall 210 for directing a fluid along a flow path 204 defined and surrounded by an interior wall surface 212 of annular wall 210. Annular wall 210 may have an interior wall circumference 220, an exterior wall circumference 222, a wall thickness 224, and a wall length 226. Circumference may refer to a closed path around a cross-section of an annular structure (defined by a surface or another transition in mechanical structure) and may not be limited to a geometrically circular paths, such as where the cross-section includes body shapes that are oval, elliptical, or some other shape or there are variations in wall thickness. Interior wall circumference 220 may define a diameter and a cross-sectional area of flow component 200 and a flow capacity for flow component 200. Wall thickness 224, wall material, and internal wall structures may generally determine the strength, stress-resistance, and wear and failure characteristics of flow component 200. Incorporation of stress-resistant interior wall structures (not shown) in stress areas may improve the strength, stress-resistance, and wear and failure characteristics of flow component 200. In some embodiments, interior wall circumference 220 and/or exterior wall circumference 222 may vary along wall length 226 creating two or more wall thicknesses along wall length 226 and one or more wall thickness transitions, which may include step or graded wall thickness transitions. In some embodiments, annular wall 210 may be inserted into, surrounded by, or continuous with an adjacent flow component 230 to form a junction outlet 206 where flow path 204 fluidically connects to adjacent flow path 232, such as a downstream flow toward an outlet from adjacent flow component 230. Adjacent flow component 230 may include a body 234 that is complementary with, accommodates, and locates annular wall 210. For example, body 234 may be the annular wall of an output line of an output manifold and flow component 200 may be header link and/or nozzle connector for a header link. In some embodiments, annular wall 210 and at least some portion of body 234 may be a continuous structure made in the same additive manufacture build process. In some embodiments, mechanical and/or thermal stresses may vary along wall length 226 and the interior structure of annular wall 210 may also vary along wall length 226.

Referring to FIG. 4, an example stress measurement for a flow component 400 is shown. Similar to FIG. 2 above, flow component 400 is shown as a cross-section on a diameter of annular wall 410. Annular wall 410 has a first wall thickness 412 and a second wall thickness 414 with a step wall thickness transition 416. Annular wall 410 is shown with stress points 420, 430 shown on the left side 402 without stress lines and on the right side 404 with radiating stress lines 422, 432 and a stress vector 424 for stress point 420. In some embodiments, stress points 420, 430 may define one or more stress regions 426, 436 in annular wall 410. Stress regions 426, 436 may be defined in contrast or comparison with normative regions 440 surrounding stress regions 426, 436. For example, stress regions 426, 436 may be defined from stress points 420, 430 to include the surrounding area of three stress lines 422, 432 or stress map contours representing a defined gradient from stress points 420, 430 to normative stress values in normative regions 440. A variety of stress models, stress values, and/or statistical definitions of normative versus stress regions may be used to calculate and define stress regions 426, 436 and normative regions 440 for any given proposed flow component design. For example, stress regions 426, 436 and normative regions 440 may be modeled for key mechanical factors, such as creep and fatigue. Differences in the exposure to use factors creating creep and fatigue may define stress regions 426, 436 from normative regions 440 and design of stress resistant internal structures for stress regions 426, 436 may include structures that better balance the creep and fatigue characteristics of stress regions 426, 436 given the enhanced stress conditions. Normative may mean a first region of a component that has stress-related values lower than a second region with higher stress-related values, or stress region.

Referring to FIG. 5, an example stress-resistant internal structure 550 for a flow component 500 is shown on the right side 504. Similar to FIGS. 2 and 4, a cross-section along a diameter of flow component 500 is shown, but the detail of stress-resistant internal structure 550 is shown only on right side 504. In some embodiments, stress-resistant internal structure 550 may be arranged in an annular configuration and would also be present in the internal structure of the left side 502. In some embodiments, stress-resistant internal structure 550 may be understood in contrast with adjacent normative internal structure 540. For example, normative internal structure 540 may include solid material, such as the same metal used to additive manufacture stress-resistant internal structure 550 or an alternate material that is different than the metal used in stress-resistant internal structure 550. In some embodiments, normative internal structure 540 may be manufactured by a process different than stress-resistant internal structure 550, such as a separate additive manufacture process or a reductive manufacture process, and fused or otherwise bonded in an assembly step. In some embodiments, normative internal structure 540 may be formed alongside stress-resistant internal structure 550 as part of a common additive manufacture process using the same material and program code for a continuous structure (but with distinct regions). Stress-resistant internal structure 550 may be located within flow component 500 to correspond with stress regions and/or stress points measured similar to the stress measurement in FIG. 4 and normative internal structure 540 may be located within flow component 500 to correspond with normative regions.

Flow component 500 may also include a continuous skin 530 on the interior wall surface 512 of annular wall 510. Continuous skin 530 may define a portion of or the entire interior wall surface 512 to provide a continuous contact surface for guiding fluids through the flow path 514 of flow component 500. In some embodiments, continuous skin 530 may include a solid material having a skin thickness 532 along stress-resistant internal structure 550. For example, continuous skin 530 may be a continuous wall of material with skin thickness 532 that is of the same material and solid composition as normative internal structure 540 and separates flow path 514 from stress resistant internal structure 550. Continuous skin 530 may be formed alongside stress-resistant internal structure 550 and/or normative internal structure 540 as part of a common additive manufacture process using the same material and program code for a continuous structure.

In the example shown, stress-resistant internal structure 550 is an additive manufactured mesh 552 including irregularly shaped geometric nodes 554 defining voids 556 between and among geometric nodes 554. Mesh 552 may include a pattern of material and voids to create a more complex internal structure with enhanced stress-resistant features. For example, a plurality of three-dimensional geometric nodes of varying shapes and sizes may be assembled and/or fused to fill a space with a supportive structure based on contact between and among adjacent shapes. The irregularity of fit among irregularly shaped geometric nodes 554 may create voids 556 and/or interfaces that may absorb stress and/or prevent propagation of stress-related wear. Additive manufactured mesh 552 may include fused geometric nodes 554, where adjacent geometric nodes 554 include one or more node interfaces or "contact points" between geometric nodes 554 that are fused into a continuous structure by the additive manufacture design and process. Because of mesh 552, stress region cross-section 558 may have a different internal structure than normative region cross-section 542. Stress region cross-section 558 may include a pattern of node materials and voids and normative region cross-section 542 may include continuous solid material.

Referring to FIG. 6, a cutaway perspective view of a flow component 600 with a stress-resistant structure 650 is shown. Right facing cross-section 602 through annular wall 610 shows an internal mesh 652 arranged in interconnected concentric bands from interior wall surface 612 to exterior wall surface 614. In some embodiments, annular wall 610 includes both an interior continuous skin 616 to form wall surface 614 and an exterior skin 618. Interior wall surface 612 may define a flow path 604 through flow component 600. Mesh 652 may include a radiating pattern of interconnected geometric nodes 654 and support members 656 between adjacent geometric nodes 654 that define voids 658 among geometric nodes 654 and support members 656. For example, groups of eight nodes (in a 2×2×2 configuration) may be treated as corners of a generally cubic structure defining a void within the cubic structure. In some embodiments, mesh 652 may vary along one or more axes (x, y, z), such that the cross-section is intentionally non-uniform. For example, mesh 653 includes support members 656 that radiated outward from interior continuous skin 616 to exterior skin 618, meaning that the dimensions of support members 656, relative positions of geometric nodes 654, and size of voids 658 may be different along any given radius. Other variations in the structure of mesh 652 may occur in any direction to create intentional non-uniformities, such as by varying the dimensions of any portion of one or more repeating support structures and/or the shape or size of voids defined within mesh 652.

An additional cutaway of exterior skin 618 on flow component 600 shows exterior skin thickness 620 and a lateral view of mesh 652 along a portion of the length of flow component 600. Flow component 600 may include a perpendicular annular wall 630 for a flow path 606. In some embodiments, annular wall 630 may include mesh 652 in a stress region 632 and a solid material 634 in a normative region 636.

Referring to FIG. 7, a cross-section with a stress-resistant internal structures 750, 760 for a flow component 700 is shown on the right side 704. Similar to FIGS. 2, 4, and 5, a cross-section along a diameter of flow component 700 is shown, but stress-resistant internal structures 750, 760 are shown only on right side 704. In some embodiments, stress-resistant internal structures 750, 760 may be arranged in an annular configuration and would also be present in the internal structure of left side 702. In some embodiments, stress-resistant internal structures 750, 760 may be understood in contrast with adjacent normative internal structure 740. Annular wall 710 may surround flow path 706 and include an interior wall surface 712. Stress contours illustrate the presence of stress regions 752, 762.

Stress-resistant internal structures 750, 760 may include mesh 754, 764 composed of additive manufactured material matrix 756, 766 defining a plurality of voids 758, 768. Magnified detail panel 708 shows stress resistant internal structure 750 in greater detail. In some embodiments, voids 758, 768 may include geometric shapes in varying orientations within material matrix 756, 766. For example, voids 758, 768 may include triangles with radiused corners surrounded and defined by the structural material of material matrix 756, 766. Material matrix 756, 766 may surround and define voids of other polygonal shapes (with or without radiused corners) and/or curved shapes, such as triangles, squares, pentagons, hexagons, octagons, circles, ovals, ellipses, etc. In some embodiments, voids 758, 768 may include repeating shapes with a defined cross-sectional shape (such as a triangle with radiused corners) in at least two-dimensions and varying dimensions and spacings (intervening material of material matrix 756, 766) to provide different stress resistance characteristics. In some embodiments, material matrix 756, 766 around voids 758, 768 may define a mesh in one or more mesh patterns, such as cubic, honeycomb, or similar lattice structures. In some embodiments, a continuous skin 720 may surround normative internal structure 740 and stress-resistant internal structures 750, 760.

Referring to FIG. 8, a method 800 of additive manufacturing a flow component, such as the flow components shown and described above with regard to FIGS. 1-7. In 810, a potential flow component may be modeled using computer-aided modeling. For example, an output manifold and flow components therein may be designed and modeled for a particular heat recovery steam generator, including physical dimensions and material properties. In 820, a stress profile may be measured for the modeled flow component using computer modeling. For example, the modeled flow component may be processed through a mathematical model for simulating material stresses in one or more use conditions, such as a high cycling operating environment. In some embodiments, the output of the measurement is a stress map of the flow component that includes both stress points and stress values as they propagate through the internal structures of the flow component to different positions across the cross-section of the flow component. In 830, one or more stress regions may be defined for the proposed flow component based on the stress profile. For example, based on the statistical distribution of stress values in the component, a threshold value for elevated stress may be used to define specific regions of the component as a stress region. In 832, a mesh structure may be selected to provide a stress-resistant internal structure for one or more stress regions. For example, based on the stress point and size and intensity of the stress region, a mesh structure incorporating a structural material matrix defining a plurality of voids of desired shapes, sizes, and orientations may be selected. In 834, the selected mesh structure may be located within the flow component to occupy some or all of the stress region. For example, a stress region adjacent a junction output between the modeled flow component and an adjacent flow component may define an annular region at a certain range of positions along the length and thickness of the annular wall of the flow component. In 836, a skin thickness may be selected to provide a continuous skin over the selected mesh that defines and maintains the desired surface conditions for the internal wall surface of the flow component. For example, a skin thickness of one millimeter may be selected to separate the selected mesh from the fluid flow within the flow component. In 840, the normative region may be defined in contrast to the stress region. For example, everything below the threshold value defined for elevated stress may be defined as part of the normative region. In 842, an internal structure may be selected for the normative regions. For example, a solid structure of the manufacturing material may be used for the normative region. In some embodiments, an alternative mesh structure with a different cross-section structure than the mesh used for the stress regions may be selected to provide different thermal, mechanical, and/or cost characteristics. In 850, program code for the proposed flow component may be generated based on the component model and selected materials and structures. For example, an additive manufacturing file may be created describing the physical details of the flow component in the specification and format of a desired additive manufacturing system. In 860, at least one flow component based on the program code may be additive manufactured. For example, additive manufacturing system 900 in FIG. 9 may be used to produce one or more flow components.

Figure 9:
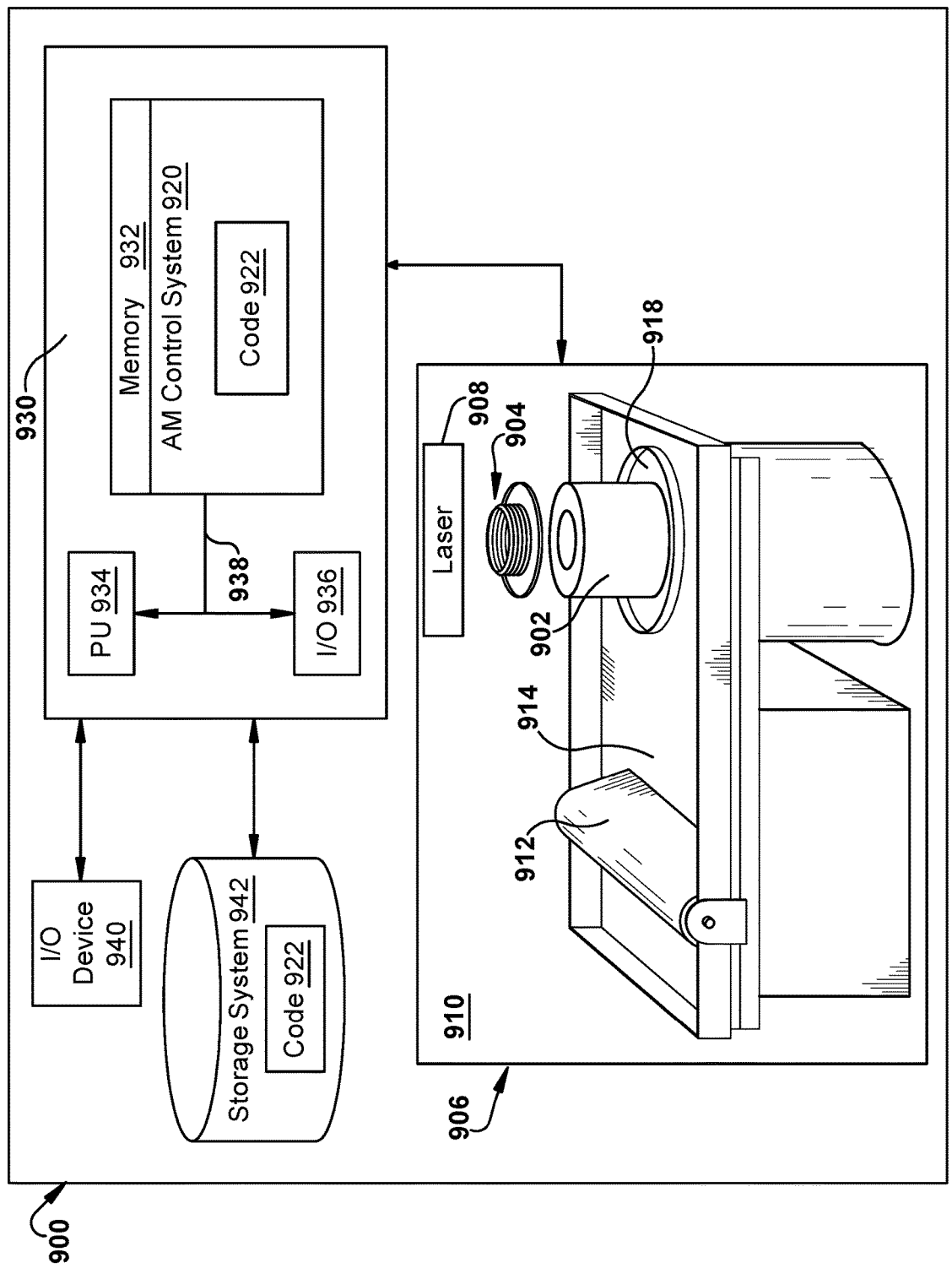
FIG. 9 shows a diagram of an example system for additive manufacturing according to various embodiments of the disclosure.

Referring to FIG. 9, an example additive manufacturing system 900 is shown, such as may be used for method 800 above. Additive manufacturing includes a wide variety of processes of producing an object through the successive layering of material rather than the removal of material. Additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object. Current categories of additive manufacturing may include: binder jetting, material extrusion, powder bed infusion, directed energy deposition, sheet lamination and vat photopolymerization.

Additive manufacturing techniques typically include taking a three-dimensional (3D) computer aided design (CAD) file of the object to be formed, electronically slicing the object into layers (e.g., 18-102 micrometers thick) to create a file with a two-dimensional image of each layer (including vectors, images or coordinates) that can be used to manufacture the object. The 3D CAD file can be created in any known fashion, e.g., computer aided design (CAD) system, a 3D scanner, or digital photography and photogrammetry software. The 3D CAD file may undergo any necessary repair to address errors (e.g., holes, etc.) therein, and may have any CAD format such as a Standard Tessellation Language (STL) file. The 3D CAD file may then be processed by a preparation software system (sometimes referred to as a "slicer") that interprets the 3D CAD file and electronically slices it such that the object can be built by different types of additive manufacturing systems. The preparation software system may be part of the CAD system, part of the AM system or separate therefrom. Where separate, the preparation software system may output an object code file in any format capable of being used by the desired AM system. For example, the object code file may be an STL file or an additive manufacturing file (AMF), the latter of which is an international standard that is an extensible markup-language (XML) based format designed to allow any CAD software to describe the shape and composition of any three-dimensional object to be fabricated on any AM printer. Depending on the type of additive manufacturing used, material layers are selectively dispensed, sintered, formed, deposited, etc., to create the object per the object code file.

One form of powder bed infusion (referred to herein as metal powder additive manufacturing) may include direct metal laser melting (DMLM) (also referred to as selective laser melting (SLM)). In metal powder additive manufacturing, metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the object geometry can be fused by selectively melting the metal powder. The melting may be performed by a high powered irradiation beam, such as a 100 Watt ytterbium laser, to fully weld (melt) the metal powder to form a solid metal. The irradiation beam moves or is deflected in the X-Y direction, and has an intensity sufficient to fully weld (melt) the metal powder to form a solid metal. The metal powder bed may be lowered for each subsequent two dimensional layer, and the process repeats until the object is completely formed.

FIG. 9 shows a schematic/block view of an illustrative computerized metal powder additive manufacturing system 900 (hereinafter 'AM system 900') for generating an object(s) 902, which may include one large object or multiple objects, e.g., two objects 902, 904 as shown. The teachings of the disclosures will be described relative to building object(s) 902, 904 using one or more irradiation devices, e.g., laser 908, but it is emphasized and will be readily recognized that the teachings of the disclosure are equally applicable to build multiple object(s) 902, 904 using any number of irradiation devices, i.e., one or more. In this example, AM system 900 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Object(s) 902, 904 are illustrated as circular elements; however, it is understood that the additive manufacturing process can be readily adapted to manufacture any shaped object, a large variety of objects and a large number of objects on a build platform 918.

AM system 900 generally includes a metal powder additive manufacturing control system 920 ("control system") and an AM printer 906. As will be described, control system 920 executes object code 920 to generate object(s) 902, 904 using laser 908. Control system 920 is shown implemented on computer 930 as computer program code. To this extent, computer 930 is shown including a memory 932 and/or storage system 942, a processor unit (PU) 934, an input/output (I/O) interface 936, and a bus 938. Further, computer 930 is shown in communication with an external I/O device/resource 940 and storage system 942. In general, processor unit (PU) 934 executes computer program code 922 that is stored in memory 932 and/or storage system 942. While executing computer program code 922, processor unit (PU) 934 can read and/or write data to/from memory 932, storage system 942, I/O device 940 and/or AM printer 906. Bus 938 provides a communication link between each of the objects in computer 930, and I/O device 940 can comprise any device that enables a user to interact with computer 930 (e.g., keyboard, pointing device, display, etc.). Computer 930 is only representative of various possible combinations of hardware and software. For example, processor unit (PU) 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as an industrial controller, a network server, a desktop computer, a laptop, a handheld device, etc.

As noted, AM system 900 and, in particular control system 930, executes program code 922 to generate object(s) 902, 904. Program code 922 can include, inter alia, a set of computer-executable instructions for operating AM printer 906 or other system parts, and a set of computer-executable instructions defining object(s) 902, 904 to be physically generated by AM printer 906. As described herein, additive manufacturing processes begin with a non-transitory computer readable storage medium (e.g., memory 932, storage system 942, etc.) storing program code 922. System code for operating AM printer 906 may include any now known or later developed software code capable of operating AM printer 906.

Program code 922 defining object(s) 902, 904 may include a precisely defined 3D model of an object and can be generated from any of a large variety of well-known computer aided design (CAD) software systems such as AutoCAD®, TurboCAD®, DesignCAD 3D Max, etc. In this regard, program code 922 can include any now known or later developed file format. Furthermore, program code 922 representative of object(s) 902, 904 may be translated between different formats. For example, program code 922 may include Standard Tessellation Language (STL) files which was created for stereolithography CAD systems, or an additive manufacturing file (AMF), which is an international standard that is an extensible markup-language (XML) based format designed to allow any CAD software to describe the shape and composition of any three-dimensional object to be fabricated on any AM printer. Program code 922 representative of object(s) 902, 904 may also be converted into a set of data signals and transmitted, received as a set of data signals and converted to code, stored, etc., as necessary. In any event, program code 922 may be an input to AM system 900 and may come from a part designer, an intellectual property (IP) provider, a design company, the operator or owner of AM system 900, or from other sources. Control system 920 executes program code 922, dividing object(s) 902, 904 into a series of thin slices that assembles using AM printer 906 in successive layers of material.

AM printer 906 may include a processing chamber 910 that is sealed to provide a controlled atmosphere for object(s) 902, 904 printing, e.g., a set pressure and temperature for lasers, or a vacuum for electron beam melting. A build platform 918, upon which object(s) 902, 904 is/are built, is positioned within processing chamber 910. A laser 908, or any number of alternate irradiation device(s), is configured to melt layers of metal powder from powder bed 914 on build platform 918 to generate object(s) 902, 904. Distributor 912 successively moves metal powder from powder bed 914 onto build platform 918 for use in building successive layers of objects 902, 904 in accordance with program code 922.

In some embodiments, program code 922 includes an additive manufacturing file describing a flow component, such as one or more of the flow components described with respect to FIGS. 1-7 above. Objects 902, 904 may include one or more flow components or sub-assemblies thereof designed in accordance with method 800 in FIG. 8 above.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A flow component comprising:
    an annular wall having an interior wall surface defining a flow path for a fluid, the annular wall having a wall circumference, a wall length, and a wall thickness;
    at least one stress region in the annular wall, the at least one stress region including a continuous skin having a skin thickness and defining a portion of the interior wall surface and an additive manufactured mesh adjacent the continuous skin in the direction of the wall thickness, the mesh comprised of structural material and a plurality of voids;
    at least one normative region in the annular wall, the at least one normative region including a normative cross-section in a direction of the wall thickness that has a different structure than the mesh of the at least one stress region; and
    wherein the structural material of the mesh includes a plurality of fused geometric nodes of a plurality of sizes and defining the plurality of voids.

2. The flow component of claim 1, wherein the annular wall defines a junction opening into an adjacent flow component and the at least one stress region is adjacent the junction opening.

3. The flow component of claim 2, wherein the annular wall has a first wall thickness and a second wall thickness along the wall length and defining a thickness transition region between the first wall thickness and the second wall thickness, the at least one stress region being adjacent to the thickness transition region.

4. The flow component of claim 1, wherein the structural material of the mesh includes a lattice of repeating support structures defining the plurality of voids.

5. The flow component of claim 4, wherein the lattice of repeating support structures is arranged in a plurality of concentric rings from the continuous skin outward along the wall thickness at the at least one stress region.

6. The flow component of claim 1, wherein the structural material defines the plurality of voids to be repeating shapes surrounded by the structural material.

7. The flow component of claim 1, wherein the normative cross-section is continuously solid structural material.

8. The flow component of claim 1, wherein the flow component comprises a portion of a manifold for distributing fluids in a power plant.

9. An output manifold for a heat recovery steam generator comprising:
    an annular wall having an interior wall surface defining a flow path for a fluid, the annular wall having a wall circumference, a wall length, and a wall thickness;
    at least one stress region in the annular wall, the at least one stress region including a continuous skin having a skin thickness and defining a portion of the interior wall surface and an additive manufactured mesh adjacent the continuous skin in the direction of the wall thickness, the mesh comprised of structural material and a plurality of voids;
    at least one normative region in the annular wall, the at least one normative region including a normative cross-section in a direction of the wall thickness that has a different structure than the mesh of the at least one stress region; and wherein the structural material of the mesh includes a plurality of fused geometric nodes of a plurality of sizes and defining the plurality of voids.

10. The output manifold of claim 9, wherein the structural material defines the plurality of voids to be repeating shapes surrounded by the structural material.

11. The output manifold of claim 9, wherein the annular wall defines a junction opening into an adjacent flow component and the at least one stress region is adjacent the junction opening.

12. The output manifold of claim 11, wherein the annular wall has a first wall thickness and a second wall thickness along the wall length and defining a thickness transition region between the first wall thickness and the second wall thickness, the at least one stress region being adjacent to the thickness transition region.

13. The output manifold of claim 9, wherein the structural material of the mesh includes a lattice of repeating support structures defining the plurality of voids.

14. The output manifold of claim 13, wherein the lattice of repeating support structures is arranged in a plurality of concentric rings from the continuous skin outward along the wall thickness at the at least one stress region.

15. An additive manufactured flow component comprising:
    an annular wall having an interior wall surface defining a flow path for a fluid, the annular wall having a wall circumference, a wall length, and a wall thickness, wherein the annular wall includes a sintered metal;
    at least one stress region in the annular wall, the at least one stress region including a continuous skin having a skin thickness and defining a portion of the interior wall surface and an additive manufactured mesh adjacent the continuous skin in the direction of the wall thickness, the mesh comprised of structural material and a plurality of voids;
    at least one normative region in the annular wall, the at least one normative region including a normative cross-section in a direction of the wall thickness that has a different structure than the mesh of the at least one stress region; and
    wherein the structural material of the mesh includes a plurality of fused geometric nodes of a plurality of sizes and defining the plurality of voids.

16. The additive manufactured flow component of claim 15, wherein the structural material of the mesh includes a lattice of repeating support structures defining the plurality of voids.

17. The additive manufactured flow component of claim 16, wherein the lattice of repeating support structures is arranged in a plurality of concentric rings from the continuous skin outward along the wall thickness at the at least one stress region.

* * * * *